United States Patent

Castle

(10) Patent No.: US 10,846,453 B1
(45) Date of Patent: Nov. 24, 2020

(54) GENERATING INTERRELATED PATH GROUPS BY USING MACHINE LEARNING

(71) Applicant: Synopsys, Inc., Mountain View, CA (US)

(72) Inventor: David E. Castle, Riverside, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/574,923

(22) Filed: Sep. 18, 2019

Related U.S. Application Data

(60) Provisional application No. 62/733,854, filed on Sep. 20, 2018.

(51) Int. Cl.
*G06F 30/394* (2020.01)
*G06F 17/16* (2006.01)
*G06N 20/00* (2019.01)
*G06F 119/12* (2020.01)

(52) U.S. Cl.
CPC ........... *G06F 30/394* (2020.01); *G06F 17/16* (2013.01); *G06N 20/00* (2019.01); *G06F 2119/12* (2020.01)

(58) Field of Classification Search
CPC ........ G06F 30/394; G06F 17/16; G06N 20/00
USPC ....................................................... 716/113
See application file for complete search history.

(56) References Cited

U.S. PATENT DOCUMENTS

| | | | | |
|---|---|---|---|---|
| 5,237,514 A | * | 8/1993 | Curtin | G06F 30/392 716/113 |
| 8,788,995 B1 | * | 7/2014 | Kumar | G06F 30/00 716/113 |
| 9,415,426 B1 | * | 8/2016 | Blake | B08B 3/024 |
| 9,875,333 B1 | * | 1/2018 | Verma | G06F 30/3312 |
| 2005/0108665 A1 | * | 5/2005 | Neves | G06F 30/327 716/113 |
| 2006/0010410 A1 | * | 1/2006 | Curtin | G06F 30/3312 716/108 |
| 2006/0010413 A1 | * | 1/2006 | Curtin | G06F 30/3312 716/122 |
| 2008/0052655 A1 | * | 2/2008 | Curtin | B62K 25/286 716/114 |

* cited by examiner

*Primary Examiner* — Suchin Parihar
(74) *Attorney, Agent, or Firm* — Park, Vaughan, Fleming & Dowler LLP; Laxman Sahasrabuddhe

(57) ABSTRACT

Techniques and systems for generating path groups for a set of violating timing path end-points in an integrated circuit (IC) design are described. Some embodiments can determine a set of attribute values for each violating timing path end-point in a set of violating timing path end-points. Next, the embodiments can use an unsupervised machine learning clustering technique to determine a set of clusters by using the attribute values. The embodiments can then generate a path group for each cluster, wherein the path group includes violating timing path end-points that belong to the cluster.

20 Claims, 2 Drawing Sheets

102 → i_CORTEXR4F/u_cortexr4noram_u_cr4dpu/u_dpu_dp/

104 → i_CORTEXR4F/u_cortexr4dbbg/

FIG. 1

202 →         A B C D E F G H I J K L M N O P Q R S T U V W X Y Z 0 1 2 3 4 5 6 7 8 9
ex2_reg_12_/D [0,0,0,1,2,0,1,0,0,0,0,0,0,0,0,0,0,1,0,0,0,1,0,0,0,1,2,0,0,0,0,0,0,0,0,0]
sync0a_sync/D [1,0,2,1,0,0,0,0,0,0,0,0,2,0,0,0,0,0,2,0,0,0,0,2,0,1,0,0,0,1,2,0,0,0,0,0]
distance = 18 : [1,0,2,0,2,0,1,0,0,0,0,0,0,0,2,0,0,2,0,0,1,2,0,0,1,2,0,1,1,2,0,0,0,0,0,0]

FIG. 2

GENERATING INTERRELATED PATH GROUPS BY USING MACHINE LEARNING

RELATED APPLICATION

This application claims benefit of U.S. Provisional Application Ser. No. 62/733,854, filed on 20 Sep. 2018, the contents of which are herein incorporated by reference in their entirety for all purposes.

COPYRIGHT NOTICE

The assignee of this patent document does not object to the facsimile reproduction of the patent document as it appears in the files of the United States Patent and Trademark Office, but otherwise reserves all rights whatsoever in any included works of authorship protected by copyright.

BACKGROUND

Technical Field

This disclosure relates to integrated circuit (IC) design. More specifically, this disclosure relates to generating interrelated path groups by using machine learning.

Related Art

Advances in process technology have fueled a rapid increase in the size and complexity of IC designs. This dramatic increase in complexity and integration densities has made it considerably more challenging to design ICs.

Optimization techniques are used during logical and physical synthesis to ensure that the IC design meets the required timing, power, and area constraints. To assist designers through the logical and physical optimization processes, existing tools group violating paths into path groups. However, these path groups are so large that designers are forced to rely on intuition, experience, and tedious trial and error to find the most effective paths to optimize within those groups.

SUMMARY

This section is not intended to limit the scope of the disclosed subject matter. The disclosed subject matter is to be accorded the widest scope consistent with the principles and features disclosed in the entire disclosure. Some embodiments described herein provide systems and techniques for generating interrelated path groups by using machine learning. Specifically, some embodiments generate path groups for a set of violating timing path end-points in an IC design.

Some embodiments can determine a set of attribute values for each violating timing path end-point in a set of violating timing path end-points. In some embodiments, the set of attribute values includes one or more of: a group name, a head name, a tail name, a required delay value, and a slack value. Next, the embodiments can determine a distance matrix or an affinity matrix for the set of violating timing path end-points based on the set of attribute values for the set of violating timing path end-points. The embodiments can then use an unsupervised machine learning clustering technique to determine a set of clusters based on the distance matrix or the affinity matrix, wherein each violating timing path end-point is assigned to a cluster in the set of clusters. Next, the embodiments can generate a path group for each cluster, wherein the path group includes violating timing path end-points that belong to the cluster.

In some embodiments, a weight can be assigned to each path group based on a total negative slack of violating timing path end-points in the path group. Next, the embodiments can optimize the IC design by using the path groups.

In some embodiments, the affinity matrix can be determined by: determining a distance matrix, wherein each element (i, j) in the distance matrix is a distance between a first violating timing path end-point corresponding to row i and a second violating timing path end-point corresponding to column j; and determining the affinity matrix based on the distance matrix.

In some embodiments, the distance between the first violating timing path end-point corresponding to row i and the second violating timing path end-point corresponding to column j is an Euclidean distance

BRIEF DESCRIPTION OF THE FIGURES

FIG. 1 illustrates how a hierarchy distance can be computed in accordance with some embodiments described herein.

FIG. 2 illustrates how a name distance can be computed in accordance with some embodiments described herein.

DETAILED DESCRIPTION

Figure 3:
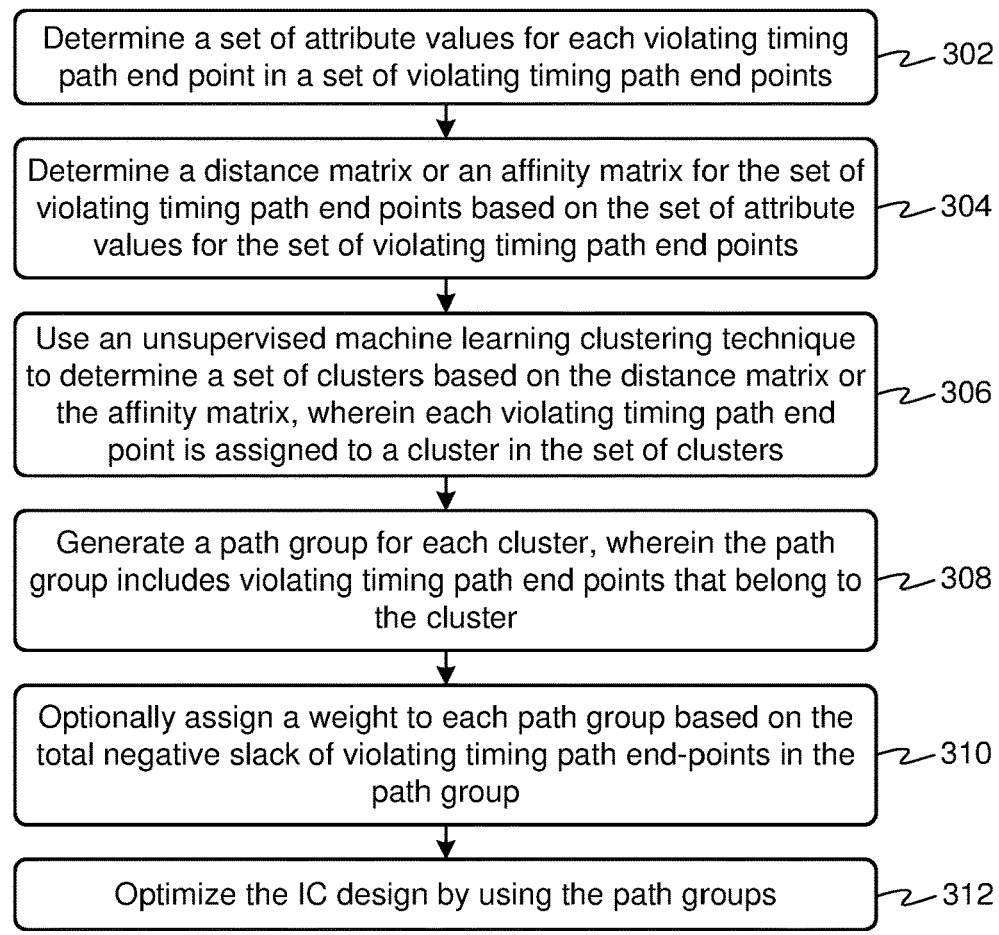
FIG. 3 illustrates a process for determining path groups in accordance with some embodiments described herein.

The following description is presented to enable any person skilled in the art to make and use the claimed invention(s), and is provided in the context of particular application(s) and/or environment(s). Various modifications to the disclosed embodiments will be readily apparent to those skilled in the art, and the general principles defined herein may be applied to other embodiments and applications without departing from the spirit and scope of the disclosure. Thus, the disclosed subject matter is not limited to the embodiments shown, but is to be accorded the widest scope consistent with the principles and features disclosed herein.

In this disclosure, numerous specific details may be described to enable one or more of the embodiments. In the interest of not obscuring the presentation of the embodiments, some features that are known in the art may be combined together, may be described in less detail, or may be implied (i.e., some well-known features may not be explicitly described). Furthermore, while this description may refer to some features in the singular tense, more than one instance of the feature may be illustrated in the figures, and like components are labeled with like numerals.

An IC design and manufacturing process produces IC chips. IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher quality of results.

As an IC design progresses through an IC design flow, the IC design can be represented at different levels of abstraction by using different data formats or languages. In general, higher levels of abstraction contain fewer details of the IC design than lower levels of abstraction. Typically, the IC design is described at a high level of abstraction in the early stages of the IC design flow, and the level of abstraction becomes progressively lower as the IC design moves through the IC design flow (i.e., the description of the IC design becomes more specific as the IC design progresses through the IC design flow).

For example, toward the beginning of the IC design flow, an IC design can be described at a high level of abstraction by using a hardware description language (HDL) which describes the functionality of the IC design but does not include information about the actual geometric shapes that will be printed on the wafer. Toward the end of the IC design flow, the same IC design can be represented in a low level of abstraction by using a data format or language such as GDSII or OASIS, which contains a description of the actual geometric shapes that are to be printed on the wafer. In between these two ends of the IC design flow, the IC design may be represented in numerous data formats or languages that describe the same IC design at different levels of abstraction.

Some examples of IC design steps and the associated software tools are described below. These examples are for illustrative purposes only and are not intended to limit the embodiments to the forms disclosed. This disclosure describes techniques and systems that can be used in one or more IC design steps.

IC design software tools enable IC designers to describe the functionality that the IC designers want to implement. These tools also enable IC designers to perform what-if planning to refine functionality, check costs, etc. During logic design and functional verification, the HDL, e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence (i.e., equivalence checking) with the RTL design and/or HDL code.

During design planning, an overall floorplan for the chip can be constructed and analyzed for timing and top-level routing. During physical implementation, circuit elements can be positioned in the layout and can be electrically connected.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped out" to produce masks which are used during fabrication.

A timing path begins at a timing start-point, and ends at a timing end-point. Specifically, a timing start-point can be a register output or a primary input, and a timing end-point can be a register input or a primary output. After an optimization transformation is applied to a logic gate, the timing information can be propagated forward from the logic gate to the timing end-points, and then backward from the affected timing end-points to the timing start-points. Further details on static timing analysis and propagation of timing information can be found in Luciano Lavagno (Editor), Louis Scheffer (Editor), Grant Martin (Editor), EDA for IC Implementation, Circuit Design, and Process Technology (Electronic Design Automation for Integrated Circuits Handbook), CRC Press, 1st Ed., March 2006.

Existing IC design tools collect violating paths into path groups to facilitate optimization. However, these path groups are so large that designers are forced to rely on intuition, experience, and tedious trial and error to find the most effective paths to optimize within those groups. In particular, designers rely on experiments that must be repeated multiple times during a project: a) as the design is refined from early RTL to finished product, b) whenever the design is changed, especially for timing-related changes, c) whenever the implementation library changes, and d) ideally, for different stages of logical synthesis and physical optimization. This hands-on process to create path groups is time-consuming and doesn't guarantee any increase in the quality of results.

In fact, some IC designs have become so large that existing EDA tools are unable to optimize the entire IC design at once. This has created a need for using a divide-and-conquer strategy to optimize such large IC designs. Currently, experienced designers achieve this in the RTL design by developing hand-optimized placement boundaries, or by developing hand-optimized path groups. This approach requires tribal knowledge, which includes legends, myths, and anecdotal accounts of tricks that may have worked in one scenario but may not work in other scenarios. Existing EDA tools only use hierarchy (logical or physical) as the criteria for clustering paths into path groups.

Some embodiments described herein use machine learning based clustering techniques to create better path groups by identifying timing violations with similar characteristics based on multiple dimensions of affinity, the multiple dimensions including, but not limited to, clock groups, end-point hierarchy, end-point name, required delay, and negative slack.

Some embodiments automatically cluster highly interrelated paths on-the-fly, just in time, as needed, at every stage of the synthesis, optimization, place, and route stage of the process. The result of the machine learning based clustering disclosed in this disclosure matches what an experienced designer would be able to achieve if the designer were allowed to spend many days analyzing the timing violations.

As an example, the clustering technique disclosed herein may group all the clock enable signals from many different hierarchical modules into a single group because the names are the same and the timing requirements are the same. When this is done, the logic synthesis and physical synthesis tools tend to work on these paths at the same time. In another example, this clustering technique may group all of the paths in a single arithmetic function into a single group because they are in the same hierarchical module even though they have wildly different timing requirements.

The machine learning based techniques described herein can require millions and billions of mathematical operations, which would be impractical without today's efficient machine learning implementations that execute on powerful processors (e.g., graphics processing units).

Specifically, in some embodiments described herein, the machine learning technique is used to produce a set of commands (e.g., a set of Tcl group_path commands) that can then be used in the IC design flow to create path groups. For example, the machine learning technique can be used in an IC design flow as follows: (1) compile the IC design, (2) generate a set of violating timing paths based on the IC design, (3) remove any path groups that were automatically generated during compilation, (4) use the machine learning technique to group the set of violating timing paths to produce a set of path groups, and (5) perform an incremental compilation by using the set of path groups. Experimental results have shown that the IC designs that are produced using embodiments described herein have a better quality of results (QoR) and a faster turn-around times (TATs) when compared with approaches that use conventional techniques for creating path groups. In other embodiments, the process may not produce a set of commands, and may use other techniques to create path groups containing violating timing path end-points, wherein each path group corresponds to a cluster that was determined by the machine learning technique.

Improved results are attainable when logic and physical synthesis tools are provided with interrelated path groups that are generated using the machine learning based techniques describe herein. Some embodiments described herein automatically construct interrelated path groups from clusters of similar timing violations.

Specifically, some embodiments use a clustering technique to create path groups comprising optimally interrelated paths based on a set of criteria. The weighted path groups can then be provided to logical synthesis and physical optimization tools. As an example, the set of criteria could include: clock group, end-point hierarchy, end-point name, required delay, and negative slack. The set of criteria could also include: launch clock, starting hierarchy, start-point name, and midpoint names. Once the set of criteria are specified, embodiments described herein create interrelated path groups based on clustering timing paths that share similar criteria values.

Some embodiments can begin by generating information for all violating paths in an IC design. Next, the process can prepare the input data that will be fed into the clustering technique. The data preparation process can begin by parsing the timing violation report. A timing violation report can comprise multiple sections, wherein each section can have a section header and include a set of individual violations. In some embodiments, the process can parse the section header to extract the delay type and group name. Each timing violation in the section can be parsed to extract the end-point, required path delay, and negative slack attributes. In some embodiments, each timing violation can be assigned a location in a 5-dimensional space based on the following five dimensions: group, head, tail, delay, and slack. In other embodiments, the process may not parse the timing report. Instead, in these other embodiments, the process may access the timing report information in memory without creating an interim external report file.

The timing violation report may contain multiple types of timing violations. In some embodiments, only two types of violations are processed—max_delay and min_delay. In some embodiments, only one type of delay is used at a time: max_delay for setup analysis and min_delay for hold analysis. In other words, some embodiments execute the clustering process for all max_delay timing violations to determine path groups for max_delay timing violations, and then execute the clustering process separately for all min_delay timing violations to determine path groups for min_delay timing violations. Each of the five dimensions that are used in the clustering process are now described.

As mentioned above, some existing IC design tools may automatically assign a path group to each timing path. Some embodiments parse the section header of each section in the timing report to extract the group name for each end-point that is included in that section. The "path group name" that is extracted using this process can be used as axis #1 in the 5-dimensional attribute space. In other embodiments, the process may not parse the timing report. Instead, in these other embodiments, the process may access the timing report information (e.g., the information contained in the section header) in memory without creating an interim external report file.

Axis #2 in the 5-dimensional attribute space can be referred to as the "head." In a timing report, the timing end-point name can comprise multiple levels separated by a separator symbol, e.g., the "/" symbol (forward slashes). The different levels consist of a "head" and a "tail," which typically indicate hierarchical module name, and end-point name with pin name, respectively. In some embodiments, everything in the timing end-point name up to the final 2 levels is referred to as the "head." The end-point head name can be used as axis #2 in the 5-dimensional attribute space. Suppose a timing end-point has the following name:

i_CORTEXR4F/u_cortexr4noram_u_cr4axis/ data_m1_reg_4/D.

Then, the "head" portion of this timing end-point name would be the following:

i_CORTEXR4F/u_cortexr4noram_u_cr4axis.

The remaining portion in the timing end-point name is called the "tail," and it comprises the last two levels (as delineated by the separator symbol) in the timing end-point name. Often, the "tail" of a timing end-point is a register name and a pin name. In some embodiments, the end-point tail name is used as axis #3 in the 5-dimensional attribute space. In the above example, the "tail" would be the following:

data_m1_reg_4_/D.

Every timing path has a required delay constraint based on clock frequency, output delay of the start-point, setup delay for the end-point, and external constraints from a file. Similar kinds of paths tend to have similar kinds of delay requirements. In some embodiments, the required delay value is used as axis #4 in the 5-dimensional attribute space.

Every violating timing path has a negative slack, which is the difference between the required path delay and the actual path delay. Similar kinds of timing violations tend to have similar values of negative slack. In some embodiments, the negative slack value is used as axis #5 in the 5-dimensional attribute space.

In some embodiments, after the data from the timing violation report has been processed, a distance matrix is created by determining the distance between each pair of points in the multidimensional attribute space. In some embodiments, each value in the matrix is calculated as the Euclidean distance between two points in the multidimensional space.

The distance along each of the dimensions is calculated using a function that is appropriate for the dimension. For numeric values, the distance can be calculated by computing the arithmetic difference. For example, axis #4 and #5 are the required delay value and the negative slack, respectively. Along these axes, the distance can be computed by determining the difference between the two values. Specifically, suppose the required delays of timing end-points $e_1$ and $e_2$ are $r_1$ and $r_2$, respectively. Then, the distance along axis #4 between timing end-points $e_1$ and $e_2$ will be $(r_2-r_1)$.

For dimensions that do not have a numeric value, a different approach can be used to determine distance. For example, the distance along axis #1, which contains the group name, can be calculated by calculating the number of changes that are required to transform one group name to another group name. Very similar group names that vary by only a few characters are considered to be closer than very different group names that vary by many characters. Specifically, in some embodiments, the distance along the "path group name" dimension (axis #1) is calculated by computing the Levenshtein distance, which is the number of edits (adds and deletions) that are required to change one string of characters into another string of characters. The Levenshtein distance is considered to be an accurate measurement of the difference between text strings, but it is very difficult to calculate. Therefore, in some embodiments, this function may only be used in axis #1, i.e., for the "path group name" dimension. Typically, there are few groups, and the names are very similar; therefore, it is important to choose an accurate method—e.g., the Levenshtein distance—to calculate the distance along this dimension even if the method is computationally expensive.

For the "head" and "tail" dimensions, a faster technique can be used to compute the distance. Specifically, for the "head" dimension (i.e., axis #2), a "hierarchy" distance can be calculated by determining the number of levels of hierarchy between the end-point head names of two different timing violation end-points. Specifically, the heads of both timing end-point names are split into different lists by the hierarchy separator "/" (forward slash) character. Next, the common values at the start of these lists are discarded. The "hierarchy" distance is the number of distinct values that remain.

FIG. 1 illustrates how a hierarchy distance can be computed in accordance with some embodiments described herein. Timing end-point head names 102 and 104 are shown in FIG. 1. The "hierarchy" distance between timing end-point head names 102 and 104 is equal to three because there are three unique names ("u_cortexr4noram_u_cr4dpu," "u_dpu_dp," and "u_cortexr4dbbg") remaining after the common "i_CORTEXR4F" values are discarded from timing end-point head names 102 and 104.

A "character counting" distance can be used for the "tail" dimension. Very similar end-point tail names that vary by only a few characters are considered to be closer than very different end-point tail names that very by many characters. Some embodiments can use a character counting method to calculate the distance, because that method is much faster than the Levenshtein distance calculation. Specifically, thirty-six counters can be initialized and incremented for each alphanumeric character in the first name and then decremented for each character in the second name. The "character counting" distance can then be the sum of the absolute value of the counters.

FIG. 2 illustrates how a name distance can be computed in accordance with some embodiments described herein. Counters 202 keep track of the number of times each of the alphanumeric character appears is a given tail. For example, the tail "ex2_reg_12_/D" contains one occurrence of the letter "d" (the case of the letter is ignored so both lowercase "d" and uppercase "D" increment the "D" counter), two occurrences of the letter "e," one occurrence of the letter "g," one occurrence of the letter "r," one occurrence of the letter "x," one occurrence of the number "1," and two occurrences of the number "2." The underscore symbol "_" and the forward slash symbol "/" are ignored in this embodiment. Likewise, the counter values are shown for the tail "sync0a_sync/D." The distance between these two tail names is equal to 18, which can be calculated by summing up the absolute value of the difference between each counter as shown in FIG. 2. Note that the both "ex2_reg_12_/D" and "sync0a_sync/D" contain a single instance of the letter "d," so that does not contribute to the distance calculation (note that the value of counter "D" is equal to 0 in the row corresponding to the distance).

As mentioned above, the required delay distance between each of the timing end-point can be calculated as the arithmetic distance between the required delay values. Likewise, the slack distance between each of the timing end-point negative slacks can be calculated as the arithmetic distance between the negative slack values.

One the distance between a pair of timing end-points has been calculated for each dimension, the Euclidean distance between the two timing end-points can be computed by determining the square-root of the sum-of-squares of the individual dimension distances. Specifically, if the distances between the two timing end-points along each of the five dimension are $d_1$, $d_2$, $d_3$, $d_4$, and $d_5$, then the Euclidean distance between these two timing end-points is given by:

$$\sqrt{d_1^2+d_2^2+d_3^2+d_4^2+d_5^2}.$$

When this calculation is performed for each pair of timing end-points, we obtain the distance matrix, which represents the Euclidean distance between each pair of timing end-points in the 5-dimensional attribute space. Specifically, element (i, j) in the distance matrix is the Euclidean distance between timing end-points corresponding to row i and column j.

Note that violating end-points that have very different values in all 5 dimensions or attributes have a much greater distance between them than violating end-points that are very similar in all 5 attributes. An unsupervised machine learning clustering technique can find these similarities between violating end-points.

Some embodiments use an unsupervised machine learning clustering process that requires an affinity matrix instead of a distance matrix. Therefore, in these embodiments, the distance matrix can be converted into an affinity matrix by subtracting each distance value from the maximum value and normalizing the result between 0 and 1. Next, path groups can be generated by using the unsupervised machine learning clustering process.

Note that there are many different clustering techniques, which all work on a similar principle of finding clusters of points that are near each other and farther away from other points. Some clustering techniques are shown below:

| Method Name | Parameters | Use Case | Geometry (Metric Used) |
| --- | --- | --- | --- |
| K-Means | number of clusters | General-purpose, even cluster size, flat geometry, not too many clusters | Distances between points |
| Affinity propagation | damping, sample preference | Many clusters, uneven cluster size, non-flat geometry | Graph distance (e.g. nearest-neighbor graph) |
| Mean-shift | bandwidth | Many clusters, uneven cluster size, non-flat geometry | Distances between points |

| Method Name | Parameters | Use Case | Geometry (Metric Used) |
|---|---|---|---|
| Spectral clustering | number of clusters | Few clusters, even cluster size, non-flat geometry | Graph distance (e.g. nearest-neighbor graph) |
| Ward hierarchical clustering | number of clusters or distance threshold | Many clusters, possibly connectivity constraints | Distances between points |
| Agglomerative clustering | number of clusters or distance threshold, linkage type, distance | Many clusters, possibly connectivity constraints, non Euclidean distances | Any pairwise distance |
| DBSCAN | neighborhood size | Non-flat geometry, uneven cluster sizes | Distances between nearest points |
| OPTICS | minimum cluster membership | Non-flat geometry, uneven cluster sizes, variable cluster density | Distances between points |
| Gaussian mixtures | many | Flat geometry, good for density estimation | Mahalanobis distances to centers |
| Birch | branching factor, threshold, optional global clusterer. | Large dataset, outlier removal, data reduction. | Euclidean distance between points |

Any of the above-mentioned techniques can potentially be used to cluster the violating paths into path groups. Some embodiments described herein choose groups of timing paths that are highly interrelated; therefore, these embodiments use a clustering technique that can differentiate between points that are part of a pattern and points that are not part of a pattern. Specifically, the "Spectral Clustering" technique can be used in some embodiments. Note that the Spectral Clustering technique can be computationally intensive and can be slow; moreover, this technique requires the user to select the number of clusters. These drawbacks can prevent this technique from being used in some embodiments. Further details on various clustering techniques can be found in a number of documents that include, but are not limited to, (1) Dongkuan Xu and Yingjie Tian, "A Comprehensive Survey of Clustering Algorithms," Annals of Data Science, June 2015, Volume 2, Issue 2, pp 165-193, (2) Zare, Habil, P. Shooshtari, A. Gupta, R. Brinkman, "Data reduction for spectral clustering to analyze high throughput flow cytometry data," BMC Bioinformatics, Volume 11, Article 403 (2010), and (3) Kriegel, Hans-Peter; Kroger, Peer; Sander, Jorg; Zimek, Arthur, "Density-based Clustering," WIREs Data Mining and Knowledge Discovery, Volume 1, Issue 3, pp. 231-240 (April 2011). The contents of these three documents are herein incorporated by reference in their entirety to provide details of clustering techniques.

In some embodiment, the "DBSCAN" technique can be used which attempts to overcome some of the drawbacks with the Spectral Clustering technique. However, DBSCAN may not be as good as Spectral Clustering for separating a nearly homogenous matrix of points into groups. Some embodiments can allow the user to choose which clustering technique is applied.

Some embodiments use both Spectral Clustering and DBSCAN. As mentioned above, the Spectral Clustering technique is more accurate but takes about 50x longer to run than DBSCAN, so it may be impractical when the number of violations is large. On the other hand, DBSCAN is not as accurate as Spectral Clustering, but runs about 50x faster than Spectral Clustering, so DBSCAN is useful in the early stages of the IC design when there are hundreds of thousands of violations.

Note that the machine learning art is undergoing intense research and new improvements are constantly being made; thus, in the future an improved clustering technique that is better than either DBSCAN or Spectral Clustering can be used. Embodiments described herein can generally work with any clustering technique. Regardless of the unsupervised machine learning technique used, the technique groups the timing violations into clusters that have strong affinity with each other according to the 5-dimension affinity matrix. At the end of clustering, each timing path end-point is assigned a label to indicate which cluster it belongs to.

Next, the embodiments can generate path grouping commands (e.g., Tcl group_path commands) that instruct the IC design tool to create path groups. In some embodiments, the total negative slack for all the violating points in each path group is calculated. Next, the total negative slack values are normalized so that these values are between 0 and 100. The process can then create a command (e.g., Tcl group_path commands) for each cluster label, with the weight parameter equal to the normalized negative slack. Assigning weights to path group in this manner can enable the IC design tool to give path groups that have a greater total negative slack magnitude higher priority during optimization.

FIG. 3 illustrates a process for determining path groups in accordance with some embodiments described herein. The process can begin by determining a set of attribute values for each violating timing path end-point in a set of violating timing path end-points (step 302). The set of attribute values for a violating timing path end-point can include: a group name, a head name, a tail name, a required delay value, and a slack value as explained above.

Next, the process can determine a distance matrix or an affinity matrix for the set of violating timing path end-points based on the set of attribute values for the set of violating timing path end-points (step 304). In some embodiments, the process can determine the affinity matrix by first determining a distance matrix, wherein each element (i, j) in the distance matrix is a distance between a first violating timing path end-point corresponding to row i and a second violating timing path end-point corresponding to column j; and then determining the affinity matrix based on the distance matrix. In some embodiments, the distance between the first violating timing path end-point corresponding to row i and the second violating timing path end-point corresponding to column j can be the Euclidean distance in the multidimensional attribute space, wherein the distance along each attribute dimension is determined by using an appropriate function.

The process can then use an unsupervised machine learning clustering technique to determine a set of clusters based on the distance matrix or the affinity matrix, wherein each violating timing path end-point is assigned to a cluster in the set of clusters (step 306). Next, the process can generate a path group for each cluster, wherein the path group includes violating timing path end-points that belong to the cluster (step 308). In some embodiments, the process can optionally assign a weight to each path group based on the total negative slack of violating timing path end-points in the path group (step 310). Next, the process can optimize the IC design by using the path groups (step 312).

Specifically, the synthesis and optimization tool can synthesize and optimize hundreds of thousands or millions of paths effectively, but as designs get bigger and bigger, it gets harder and harder to work on 10 millions or 100 millions of paths with dozens or hundreds of components each. Just searching through this vast amount of data can take a very long time.

As explained above, embodiments described herein provide a way to make this dramatically easier by breaking the design into hundreds to thousands of very highly interrelated timing path groups that are each much smaller. Clustering the timing paths using the techniques described in this disclosure have the following advantages:

By reducing the size of the search space, the synthesis and optimization tool can spend more time working on the optimal solution rather than moving data and searching for problems.

By grouping highly interrelated paths together, optimizations on one timing path in a path group tend to help related paths because they tend to share portions of logic and routing that are in the same physical area. This synergy and serendipity helps deliver better quality of results while at the same time reducing runtime.

As mentioned above, timing paths are considered highly interrelated if they share specific features. One embodiment uses five attributes or features of each timing path. However, other embodiments may use fewer or greater number of attributes. As explained above, the five attributes that are used by some embodiments are as follows:

Existing path groups that were automatically assigned by the IC design tool during logical or physical synthesis, which are usually based on user specified clocking or path groups for large internal features such as central processing unit, digital signal processor, video processor, memory interface, or input output interface.

Hierarchical design name (also referred to as the "head" portion of the timing path end-point name), which is based on grouping of many lower-level logical structures into higher levels of abstraction such as a central processing unit composed of instruction fetch units, instruction execution units, general purpose registers, integer processing units, floating point processing units, cache memories, and input output interfaces. Embodiments described herein help group these kinds of large internal features together so they can be placed in closer proximity to each other and be optimized as a unit.

Endpoint register name (also referred to as the "tail" portion of the timing path end-point name) based on the function of the endpoint so registers associated with the floating point digital signal processing accumulator will tend to be named very similar to each other and very different from the registers associated with the controller state machine that controls the operation of the instructions. This has a tendency to group very similar endpoints such as critical clock gating structures together even across hierarchy and clock grouping which is required for optimal placement and routing.

Required path delay because paths from one highly interrelated submodule through common logic to another highly interrelated submodule will tend to have very similar timing requirements, whereas paths from unrelated submodules through separate logic to other unrelated submodules will tend to have different timing requirements.

Negative slack, which is a measurement of how badly the current implementation of a logic path is missing the timing requirement. This can be a measurement of how interrelated paths are because of how much logic they have in common. Paths that are highly interrelated in other ways and have similar negative slacks probably have lots of logic in common so they will benefit from being optimized together. Paths that are highly interrelated in other ways but have vastly different negative slack problem don't share much common logic and won't benefit from being optimized together.

As explained above, the clustering technique depends on the distance between features. The distance of numeric values, such as required delay and negative slack can be determined by their numeric difference. On the other hand, the distance of textual values, such as hierarchical design name and end-point register name can be determined by the number of characters that are different in their names. In general, any technique that calculates a distance between the textual names could be used, such as: (1) the sum of ASCII characters in the first name subtracted from the sum of the ASCII characters in the second name, and/or (2) editing changes required to convert the first name into the second name.

Other embodiments may use other attributes, such as: (1) clock rise/fall sense, which might indicate certain registers in a pipeline or high-speed serial interface, (2) pin name such as D input to a register or CE input to a clock gate, which indicate common usage, (3) cell type which might indicate kind of logic structures with latches, asynchronous registers, or synchronous registers, (4) X/Y coordinates of the circuit element's location, which would indicate regions of the die such as near SRAM or input output pins, (5) operating voltage, which need to be placed in certain areas of the die, (6) name of switched power circuit, which need to be placed in close physical proximity, and (7) user attributes of a register such as dont_touch or size_only, which might indicate importance or commonality.

Figure 4:
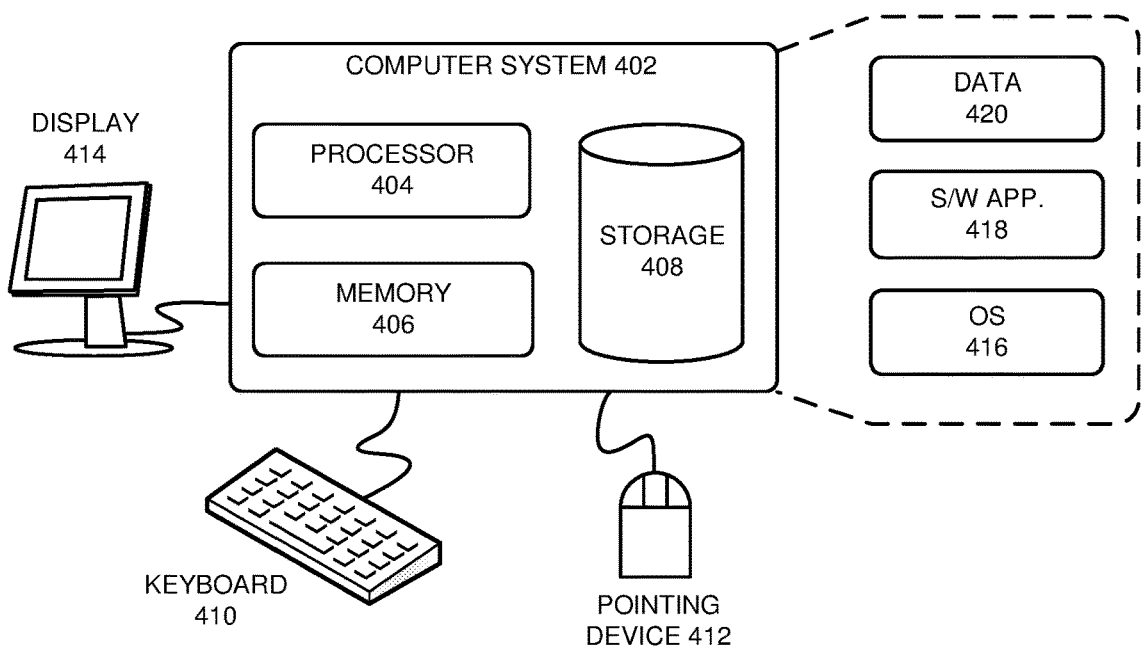
FIG. 4 illustrates a computer system in accordance with some embodiments described herein.

FIG. 4 illustrates a computer system in accordance with some embodiments described herein. The term "computer" or "computer system" generally refers to a hardware-based system that can perform computations required for the design and manufacture of ICs. Computer system 402 can include processor 404, memory 406, and storage device 408. Computer system 402 may include multiple processors, and processor 404 may include multiple cores. Specifically, memory locations in memory 406 can be addressable by processor 404, thereby enabling processor 404 to access (e.g., via load/store instructions) and manipulate (e.g., via logical/floating point/arithmetic instructions) the data stored in memory 406. Computer system 402 can be coupled to display device 414, keyboard 410, and pointing device 412. Storage device 408 can store operating system 416, software application 418, and data 420. Data 420 can include input required by software application 418 and/or output generated by software application 418.

Computer system 402 may automatically (or with user help) perform one or more operations that are implicitly or explicitly described in this disclosure. Specifically, computer system 402 can load software application 418 into memory 406, and software application 418 can then be used to generate interrelated path groups using the above-mentioned processes. The resulting IC design is expected to have better performance and/or quality of results (QoR) because interrelated path groups were determined by using the processes described in this disclosure.

While 'data' and 'information' often are used interchangeably (e.g., 'data processing' and 'information processing'), the term 'datum' (plural 'data') typically signifies a representation of the value of a measurement of a physical quantity (e.g., the current in a wire), or the answer to a question (e.g., "yes" or "no"), while the term 'information' typically signifies a structured set of data (often times signified by 'data structure'). A specified data structure is used to structure an electronic device to be used as a specific machine as an article of manufacture (see In re Lowry, 32 F.3d 1579 [CAFC, 1994]). Data and information are physical, for example binary data (a 'bit', usually signified with '0' and '1') enabled with two different levels of voltage in a circuit. For example, data can be enabled as an electrical, magnetic, optical or acoustical signal; a quantum state such as spin that enables a 'qubit'; or a physical state of an atom or molecule. All such data and information, when enabled, are stored, accessed, transferred, combined, compared, or otherwise acted upon, actions that require energy.

As used herein, the term 'process' signifies an unnatural sequence of physical actions and/or transformations (both also referred to as 'operations' or 'steps') to produce at least one result. The actions and transformations are technical applications of one or more natural laws of science or unnatural laws of technology. The actions and transformations often change the physical state of a machine, of structures of data and information, or of a composition of matter. Two or more actions can occur at about the same time, or one action can occur before or after another action, if they produce the same result. A description of the physical actions and/or transformations that comprise a process are often signified with a set of gerund phrases (or their semantic equivalents) that are typically preceded with the signifier 'the steps of' (e.g., "a process comprising the steps of measuring, transforming, partitioning and then distributing . . . "). The signifiers 'algorithm', 'method', 'procedure', '(sub)routine', 'protocol', 'recipe', and 'technique' often are used interchangeably with 'process', and 35 U.S.C. 100 defines a "method" as one type of process that is, by statutory law, always patentable under 35 U.S.C. 101. Many forms of knowledge, learning, skills and styles are authored, structured, and enabled—objectively—as processes—e.g., knowledge and learning as functions in knowledge programming languages. As used herein, the term 'rule' signifies a process with at least one conditional test (signified, e.g., by 'IF test THEN process'). As used herein, the term 'thread' signifies a sequence of operations or instructions that comprise a subset of an entire process. A process can be partitioned into multiple threads that can be used at or about at the same time.

As used herein, the term 'component' (also signified by 'part', and typically signified by 'element' when described in a patent text or diagram) signifies a physical object that is used to enable a process in combination with other components. For example, electronic components are used in processes that affect the physical state of one or more ('ensemble') electromagnetic or quantum particles/waves (e.g., electrons, photons) or quasiparticles (e.g., electron holes, phonons, magnetic domains) and their associated fields or signals. Electronic components have at least two connection points to which are attached 'leads', typically a wire with one end attached to the component and the other end attached to another component, typically as part of a circuit with current flows. There are at least three types of electrical components: passive, active and electromechanical. Passive electronic components typically do not introduce energy into a circuit—such components include resistors, memristors, capacitors, magnetic inductors, crystals, Josephson junctions, transducers, sensors, antennas, waveguides, etc. Active electronic components require a source of energy and can inject energy into a circuit—such components include semiconductors (e.g., diodes, transistors, optoelectronic devices), vacuum tubes, batteries, power supplies, displays (e.g., LEDs, LCDs, lamps, CRTs, plasma displays). Electromechanical components affect current flow using mechanical forces and structures—such components include switches, relays, protection devices (e.g., fuses, circuit breakers), heat sinks, fans, cables, wires, terminals, connectors and printed circuit boards. As used herein, the term 'netlist' is a specification of the components comprising an electric circuit, and electrical connections between the components. The programming language for the SPICE circuit simulation program is often used to specify a netlist. In the context of circuit design, the term 'instance' signifies each time a component is specified in a netlist.

One of the most important components as goods in commerce is the integrated circuit, and its res of abstractions. As used herein, the term 'integrated circuit' signifies a set of connected electronic components on a small substrate (thus the use of the signifier 'chip') of semiconductor material, such as silicon or gallium arsenide, with components fabricated on one or more layers. Other signifiers for 'integrated circuit' include 'monolithic integrated circuit', 'IC', 'chip', 'microchip' and 'System on Chip' ('SoC'). Types of integrated circuits include gate/logic arrays, processors, memories, interface chips, power controllers, and operational amplifiers. The term 'cell' as used in electronic circuit design signifies a specification of one or more components, for example, a set of transistors that are connected to function as a logic gate. Cells are usually stored in a database, to be accessed by circuit designers and design processes.

As used herein, the term 'module' signifies a tangible structure for acting on data and information that typically is limited in size and/or complexity. For example, the term 'module' can signify one or more processes that transforms data and information, for example, processes comprising a computer program. The term 'module' also can signify one or more interconnected electronic components, such as digital logic devices. A process comprising a module, if specified in a programming language, such as System C or Verilog, also can be transformed into a specification for a structure of electronic components that transform data and information that produce the same result as the process. This last sentence follows from a modified Church-Turing thesis, which is simply expressed as "Whatever can be transformed by a (patentable) process and a processor, can be transformed by a (patentable) equivalent set of modules.", as opposed to the doublethink of deleting only one of the "(patentable)".

A module is permanently structured (e.g., circuits with unalterable connections), temporarily structured (e.g., circuits or processes that are alterable with sets of data), or a combination of the two forms of structuring. Permanently structured modules can be manufactured, for example, using Application Specific Integrated Circuits ('ASICs') such as Arithmetic Logic Units ('ALUs'), Programmable Logic Arrays ('PLAs'), or Read Only Memories ('ROMs'), all of which are typically structured during manufacturing. For example, a permanently structured module can comprise an integrated circuit. Temporarily structured modules can be manufactured, for example, using Field Programmable Gate Arrays (FPGAs—for example, sold by Xilink or Intel's Altera), Random Access Memories (RAMs) or microprocessors. For example, data and information is transformed using data as an address in RAM or ROM memory that stores output data and information. One can embed temporarily structured modules in permanently structured modules (for example, a FPGA embedded into an ASIC).

Modules that are temporarily structured can be structured during multiple time periods. For example, a processor comprising one or more modules has its modules first structured by a manufacturer at a factory and then further structured by a user when used in commerce. The processor can comprise a set of one or more modules during a first time period, and then comprise a different set of one or modules during a second time period. The decision to manufacture or implement a module in a permanently structured form, in a temporarily structured form, or in a combination of the two forms, depends on issues of commerce such as cost, time considerations, resource constraints, tariffs, maintenance needs, national intellectual property laws, and/or specific design goals. How a module is used is mostly independent of the physical form in which it is manufactured or enabled. This last sentence also follows from the modified Church-Turing thesis.

As used herein, the term 'processor' signifies a tangible data and information processing machine for use in commerce that physically transforms, transfers, and/or transmits data and information, using at least one process. A processor consists of one or more modules (e.g., a central processing unit, 'CPU'; an input/output ('I/O') controller, a memory controller, a network controller, and other modules). The term 'processor' can signify one or more processors, or one or more processors with multiple computational cores/CPUs, specialized processors (for example, graphics processors or signal processors), and their combinations. Where two or more processors interact, one or more of the processors can be remotely located. Where the term 'processor' is used in another context, such as a 'chemical processor', it will be signified and defined in that context.

The processor can comprise, for example, digital logic circuitry (for example, a binary logic gate), and/or analog circuitry (for example, an operational amplifier). The processor also can use optical signal processing, DNA transformations or quantum operations, microfluidic logic processing, or a combination of technologies, such as an optoelectronic processor. For data and information structured with binary data, any processor that can transform data and information using the AND, OR and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing and retrieving data and information, using any process or structure equivalent to the bioelectric structures and processes of the human brain.

The one or more processors also can use a process in a 'cloud computing' environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified interfaces (e.g., an application program interface ('APP) that signifies functions and data structures to communicate with the remote process).

As used herein, the term 'computer' and 'computer system' (further defined below) includes at least one processor that, for example, performs operations on data and information such as (but not limited to) the AND, OR and NOT logical operations using electronic gates that can comprise transistors, with the addition of memory (for example, memory structured with flip-flops using the NOT-AND or NOT-OR operation). Such a processor is Turing-complete and computationally universal. A computer can comprise a simple structure, for example, comprising an I/O module, a CPU, and a memory that performs, for example, the process of inputting a signal, transforming the signal, and outputting the signal with no human intervention.

As used herein, the term 'programming language' signifies a structured grammar for specifying sets of operations and data for use by modules, processors and computers. Programming languages include assembler instructions, instruction-set-architecture instructions, machine instructions, machine dependent instructions, microcode, firmware instructions, state-setting data, or either source code or object code written in any combination of one or more higher level languages, for example, the C programming language and similar general programming languages (such as Fortran, Basic, Javascript, PHP, Python, C++), knowledge programming languages (such as Lisp, Smalltalk, Prolog, or CycL), electronic structure programming languages (such as VHDL, Verilog, SPICE or SystemC), text programming languages (such as SGML, HTML, or XML), or audiovisual programming languages (such as SVG, MathML, X3D/VRML, or MIDI), and any future equivalent programming languages. As used herein, the term 'source code' signifies a set of instructions and data specified in text form using a programming language. A large amount of source code for use in enabling any of the claimed inventions is available on the Internet, such as from a source code library such as Github.

As used herein, the term 'program' (also referred to as an 'application program') signifies one or more processes and data structures that structure a module, processor or computer to be used as a "specific machine" (see In re Alappat, 33 F3d 1526 [CAFC, 1991]). One use of a program is to structure one or more computers, for example, standalone, client or server computers, or one or more modules, or systems of one or more such computers or modules. As used herein, the term 'computer application' signifies a program that enables a specific use, for example, to enable text processing operations, or to encrypt a set of data. As used herein, the term 'firmware' signifies a type of program that typically structures a processor or a computer, where the firmware is smaller in size than a typical application program, and is typically not very accessible to or modifiable by the user of a computer. Computer programs and firmware are often specified using source code written in a programming language, such as C. Modules, circuits, processors, programs, and computers can be specified at multiple levels of abstraction, for example, using the SystemC programming language, and have value as products in commerce as taxable goods under the Uniform Commercial Code (see U.C.C. Article 2, Part 1).

A program is transferred into one or more memories of the computer or computer system from a data and information device or storage system. A computer system typically has a device for reading storage media that is used to transfer the program, and/or has an interface device that receives the program over a network. This process is discussed in the General Computer Explanation section.

The signifier 'commercial solution' signifies, solely for the following paragraph, an engineering domain-specific (and thus non-preemptive—see Bilski): electronic structure, a process for a specified machine, a manufacturable circuit (and their Church-Turing equivalents) or a composition of matter that applies science and/or technology in commerce to solve a technical problem.

The signifier 'abstract' (when used in a patent claim for any enabled embodiments disclosed herein for a new commercial solution that is a scientific use of one or more laws of nature {see Benson}, and that solves a problem of technology {see Diehr} used in commerce—or improves upon an existing commercial solution {see Diehr})—is precisely defined by the inventor(s) {see MPEP 2111.01 (9th edition, Rev. 08.2017)} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is 'difficult to understand' {see Merriam-Webster definition for 'abstract'} how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art publications that can be combined {see Alice} by a skilled person {often referred to as a 'PHOSITA', see MPEP 2141-2144 (9th edition, Rev. 08.2017)} to be equivalent to the new commercial solution, and is thus unpatentable under 35 U.S.C. 103, for example, because it is 'difficult to understand' how the new commercial solution differs from a PHOSITA-combination/-application of the existing prior art; or c) a new commercial solution is 'abstract' if it is not disclosed with a description that enables its praxis, either because insufficient guidance exists in the description, or because only a generic implementation is described {see Mayo} with unspecified components, parameters or functionality, so that a PHOSITA is unable to instantiate an embodiment of the new solution for use in commerce, without, for example, requiring special programming {see Katz} (or, e.g., circuit design) to be performed by the PHOSITA, and is thus unpatentable under 35 U.S.C. 112, for example, because it is 'difficult to understand' how to use in commerce any embodiment of the new commercial solution.

The Detailed Description signifies in isolation the individual features, structures, functions, or characteristics described herein and any combination of two or more such features, structures, functions or characteristics, to the extent that such features, structures, functions or characteristics or combinations thereof are enabled by the Detailed Description as a whole in light of the knowledge and understanding of a skilled person, irrespective of whether such features, structures, functions or characteristics, or combinations thereof, solve any problems disclosed herein, and without limitation to the scope of the Claims of the patent. When an embodiment of a claimed invention comprises a particular feature, structure, function or characteristic, it is within the knowledge and understanding of a skilled person to use such feature, structure, function, or characteristic in connection with other embodiments whether or not explicitly described, for example, as a substitute for another feature, structure, function or characteristic.

In view of the Detailed Description, a skilled person will understand that many variations of the claimed inventions can be enabled, such as function and structure of elements, described herein while remaining in the domain of the claimed inventions. One or more elements of an embodiment can be substituted for one or more elements in another embodiment, as will be understood by a skilled person. Writings about embodiments signify their uses in commerce, thereby enabling other skilled people to similarly use in commerce.

This Detailed Description is fitly written to provide knowledge and understanding. It is neither exhaustive nor limiting of the precise structures described, but is to be accorded the widest scope consistent with the disclosed principles and features. A skilled person can enable many equivalent variations. Without limitation, any and all equivalents described, signified or Incorporated By Reference in this patent application are specifically Incorporated By Reference into the Detailed Description. In addition, any and all variations described, signified or Incorporated By Reference with respect to any one claimed invention and its embodiment also are included with all other claimed inventions and their embodiments. Any such variations include both currently known variations as well as future variations, for example any element used for enablement includes a future equivalent element that provides the same function, regardless of the structure of the future equivalent element.

It is intended that the domain of the set of claimed inventions and their embodiments be defined and judged by the following Claims and their equivalents. The Detailed Description includes the following Claims, with each Claim standing on its own as a separate claimed invention. The embodiments of the claimed inventions can have more structure and features than are explicitly specified in the Claims.

The foregoing embodiments have been presented for purposes of illustration and description. They are not intended to be exhaustive or to limit the scope of this disclosure to the forms disclosed. Accordingly, many modifications and variations will be apparent to practitioners skilled in the art. Additionally, the above disclosure is not intended to limit the disclosed subject matter. The scope of the claimed invention(s) is defined by the appended claims.

What is claimed is:

1. A non-transitory storage medium storing instructions, which when executed by a processor, cause the processor to perform operations for generating path groups for a set of violating timing path end-points in an integrated circuit (IC) design, the operations comprising:

determining a set of attribute values for each violating timing path end-point in a set of violating timing path end-points;

determining a distance matrix or an affinity matrix for the set of violating timing path end-points based on the set of attribute values for the set of violating timing path end-points, wherein at least one element in the distance matrix or the affinity matrix is based on a distance between two violating timing path end-points in a multidimensional attribute space;

using an unsupervised machine learning clustering technique to determine a set of clusters based on the distance matrix or the affinity matrix, wherein each violating timing path end-point is assigned to a cluster in the set of clusters; and generating a path group for each cluster, wherein the path group includes violating timing path end-points that belong to the cluster.

2. The non-transitory storage medium of claim 1, wherein the operations comprise optimizing the IC design by using the path groups.

3. The non-transitory storage medium of claim 2, wherein the operations comprise assigning a weight to each path group based on a total negative slack of violating timing path end-points in the path group.

4. The non-transitory storage medium of claim 1, wherein the set of attribute values includes a required delay value and a slack value.

5. The non-transitory storage medium of claim 4, wherein the set of attribute values includes a group name, a head name, and a tail name.

6. The non-transitory storage medium of claim 1, wherein the affinity matrix is determined by:
  determining the distance matrix, wherein each element (i, j) in the distance matrix is a distance between a first violating timing path end-point corresponding to row i and a second violating timing path end-point corresponding to column j; and
  determining the affinity matrix based on the distance matrix.

7. The non-transitory storage medium of claim 6, wherein the distance between the first violating timing path end-point corresponding to row i and the second violating timing path end-point corresponding to column j is an Euclidean distance.

8. An apparatus, comprising:
  a processor; and
  a non-transitory storage medium storing instructions, which when executed by the processor, cause the processor to perform operations for generating path groups for a set of violating timing path end-points in an integrated circuit (IC) design, the operations comprising:
    determining a set of attribute values for each violating timing path end-point in a set of violating timing path end-points;
    determining a distance matrix or an affinity matrix for the set of violating timing path end-points based on the set of attribute values for the set of violating timing path end-points, wherein at least one element in the distance matrix or the affinity matrix is based on a distance between two violating timing path end-points in a multidimensional attribute space;
    using an unsupervised machine learning clustering technique to determine a set of clusters based on the distance matrix or the affinity matrix, wherein each violating timing path end-point is assigned to a cluster in the set of clusters; and
    generating a path group for each cluster, wherein the path group includes violating timing path end-points that belong to the cluster.

9. The apparatus of claim 8, wherein the operations comprise optimizing the IC design by using the path groups.

10. The apparatus of claim 9, wherein the operations comprise assigning a weight to each path group based on a total negative slack of violating timing path end-points in the path group.

11. The apparatus of claim 8, wherein the set of attribute values includes a required delay value and a slack value.

12. The apparatus of claim 11, wherein the set of attribute values includes a group name, a head name, and a tail name.

13. The apparatus of claim 8, wherein the affinity matrix is determined by:
  determining a distance matrix, wherein each element (i, j) in the distance matrix is a distance between a first violating timing path end-point corresponding to row i and a second violating timing path end-point corresponding to column j; and
  determining the affinity matrix based on the distance matrix.

14. The apparatus of claim 13, wherein the distance between the first violating timing path end-point corresponding to row i and the second violating timing path end-point corresponding to column j is an Euclidean distance.

15. A method for generating path groups for a set of violating timing path end-points in an integrated circuit (IC) design, the method comprising:
  determining a set of attribute values for each violating timing path end-point in a set of violating timing path end-points;
  determining, by a processor, a distance matrix or an affinity matrix for the set of violating timing path end-points based on the set of attribute values for the set of violating timing path end-points, wherein at least one element in the distance matrix or the affinity matrix is based on a distance between two violating timing path end-points in a multidimensional attribute space;
  using an unsupervised machine learning clustering technique to determine a set of clusters based on the distance matrix or the affinity matrix, wherein each violating timing path end-point is assigned to a cluster in the set of clusters; and
  generating a path group for each cluster, wherein the path group includes violating timing path end-points that belong to the cluster.

16. The method of claim 15, wherein the method comprises optimizing the IC design by using the path groups.

17. The method of claim 16, wherein the method comprises assigning a weight to each path group based on a total negative slack of violating timing path end-points in the path group.

18. The method of claim 15, wherein the set of attribute values includes a required delay value and a slack value.

19. The method of claim 18, wherein the set of attribute values includes a group name, a head name, and a tail name.

20. The method of claim 15, wherein the affinity matrix is determined by:
  determining a distance matrix, wherein each element (i, j) in the distance matrix is a distance between a first violating timing path end-point corresponding to row i and a second violating timing path end-point corresponding to column j; and
  determining the affinity matrix based on the distance matrix.

* * * * *